US012522972B2

(12) United States Patent
Patel et al.

(10) Patent No.: US 12,522,972 B2
(45) Date of Patent: Jan. 13, 2026

(54) AUTOMATIC LINT FILTER CLEANER FOR CLOTHES DRYER

(71) Applicant: Haier US Appliance Solutions, Inc., Wilmington, DE (US)

(72) Inventors: Neki Jashwant Patel, Hyderabad (IN); Jay Pareshbhai Shinde, Hyderabad (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 896 days.

(21) Appl. No.: 17/716,115

(22) Filed: Apr. 8, 2022

(65) Prior Publication Data

US 2023/0323590 A1    Oct. 12, 2023

(51) Int. Cl.
*D06F 58/22* (2006.01)
(52) U.S. Cl.
CPC .................................... *D06F 58/22* (2013.01)
(58) Field of Classification Search
CPC ....................................................... D06F 58/22
USPC ............................................................. 34/82
See application file for complete search history.

(56) References Cited

U.S. PATENT DOCUMENTS

| | | |
|---|---|---|
| 3,320,678 A | 5/1967 | Berke |
| 4,314,409 A | 2/1982 | Cartier et al. |
| 7,458,171 B1 * | 12/2008 | Lentz ................... D06F 58/206 34/595 |
| 10,753,034 B2 | 8/2020 | Dolbeare |
| 2009/0158608 A1 | 6/2009 | Schaub et al. |
| 2014/0165415 A1 * | 6/2014 | Tarifi ..................... D06F 58/22 34/82 |
| 2015/0232295 A1 * | 8/2015 | Imazeki ................ B65H 27/00 198/780 |
| 2018/0135233 A1 * | 5/2018 | Lv .......................... B01D 46/48 |
| 2019/0383313 A1 * | 12/2019 | Fowler .................. F16K 31/122 |

FOREIGN PATENT DOCUMENTS

| | | |
|---|---|---|
| EP | 2055825 B1 | 2/2011 |
| EP | 2559805 A1 | 2/2013 |
| EP | 3693506 B1 | 6/2021 |

* cited by examiner

*Primary Examiner* — Connor J Tremarche
(74) *Attorney, Agent, or Firm* — Dority & Manning, P.A.

(57) ABSTRACT

A dryer appliance includes a cabinet with drum defining a drying chamber rotatably mounted therein. Air passing through the drying chamber exhausts through a lint trap duct, where a screen filter in situated for removing lint and debris collected in the drying chamber from the passing air. A lint collector having a first opening is aligned with the screen filter. A lint scratcher is situated within and in contact with the screen filter. The lint scratcher is movable along the screen filter, scraping away lint caught on the filter. The lint scratcher moves in the direction of the lint collector until the collected lint is pushed into the lint collector for later disposal.

6 Claims, 8 Drawing Sheets

AUTOMATIC LINT FILTER CLEANER FOR CLOTHES DRYER

FIELD OF THE INVENTION

The present subject matter relates generally to dryer appliances, or more specifically, to automatic cleaning of a lint filter and collection of lint for later disposal.

BACKGROUND OF THE INVENTION

Dryer appliances generally include a cabinet with a drum rotatably mounted therein. A fan draws in ambient air past a heater and into a drying chamber within the drum, where articles of laundry are dried. As the air passes through the chamber, it accumulates lint and debris from the articles of laundry and carries them out of the chamber through a trap duct. A removable screen filter is typically situated at the mouth of the trap duct. The removable screen catches the lint and debris in the air stream and filters it out prior to exhaust of the air stream.

The filter tends to accumulate lint quickly and therefore, it is typically recommended that the filter be cleaned by the user after each drying cycle. This is an inconvenience to the user and generally disliked by consumers. Furthermore, users may forget or disregard the recommendation, allowing lint and debris to collect over multiple cycles. As lint and debris build up, they interfere with the air flow through the trap duct and the drying chamber. When build up reaches this lever, dryer performance degrades, requiring longer and longer drying times and higher energy consumption. Further, users may interpret this as a problem with the dryer itself, possibly affecting the reputation of the dryer manufacturer.

Efforts have been made to address this problem with three-dimensional filters that have an interior volume larger than the two-dimensional filters more commonly used. This allows for a higher volume of lint and debris collection before dryer performance is perfected. While these filters do delay the problem, they do not solve it. Other efforts to automate the cleaning filter have been made, but they fail to maintain the integrity of the trap duct. This deficiency not only affects the air pressure and thus the efficiency of the dryer appliance, but also enables turbulence that disturbs previously collected lint and debris, potentially causing significant messes that the user must clean up.

Accordingly, a dryer appliance that automatically cleans and lint filter is desirable. Further a dryer appliance that accommodates the organized collection of lint and debris would also be desirable. Moreover, an automated lint collection system that maintains the integrity of the trap duct would be a desirable addition.

BRIEF DESCRIPTION OF THE INVENTION

Advantages of the invention will be set forth in part in the following description, or may be apparent from the description, or may be learned through practice of the invention.

In one exemplary embodiment, a dryer appliance is provided, including a cabinet having a front side, a drum rotatably mounted within the cabinet, the drum defining a chamber for receipt of articles of laundry, a lint trap duct in fluid communication with the chamber, a screen filter within the lint trap duct, a lint collector, and a lint scratcher moveable relative to the screen filter. The screen filter further includes a collection end. The lint collector further includes a collector body and a first opening. The first opening is aligned with the collection of the screen filter. The lint scratcher further includes a scratching surface in contact with the screen filter, a scratcher body, and a protrusion extending laterally from the scratcher body in the direction of the collection end of the screen filter.

In another exemplary embodiment, a dryer appliance is provided, including a cabinet having a front side, a drum rotatably mounted within the cabinet, the drum defining a chamber for receipt of articles of laundry, a lint trap duct in fluid communication with the chamber, a screen filter within the lint trap duct, a lint collector, a lint scratcher moveable relative to the screen filter, a rotatable spool, a line attached to the rotatable spool and the lint scratcher, a constant force spring attached to the lint scratcher, and a motor for rotation the spool. The screen filter further includes a collection end. The lint collector further includes a collector body and a first opening. The first opening is aligned with the collection of the screen filter. The lint scratcher further includes a scratching surface in contact with the screen filter, a scratcher body, and a protrusion extending laterally from the scratcher body in the direction of the collection end of the screen filter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
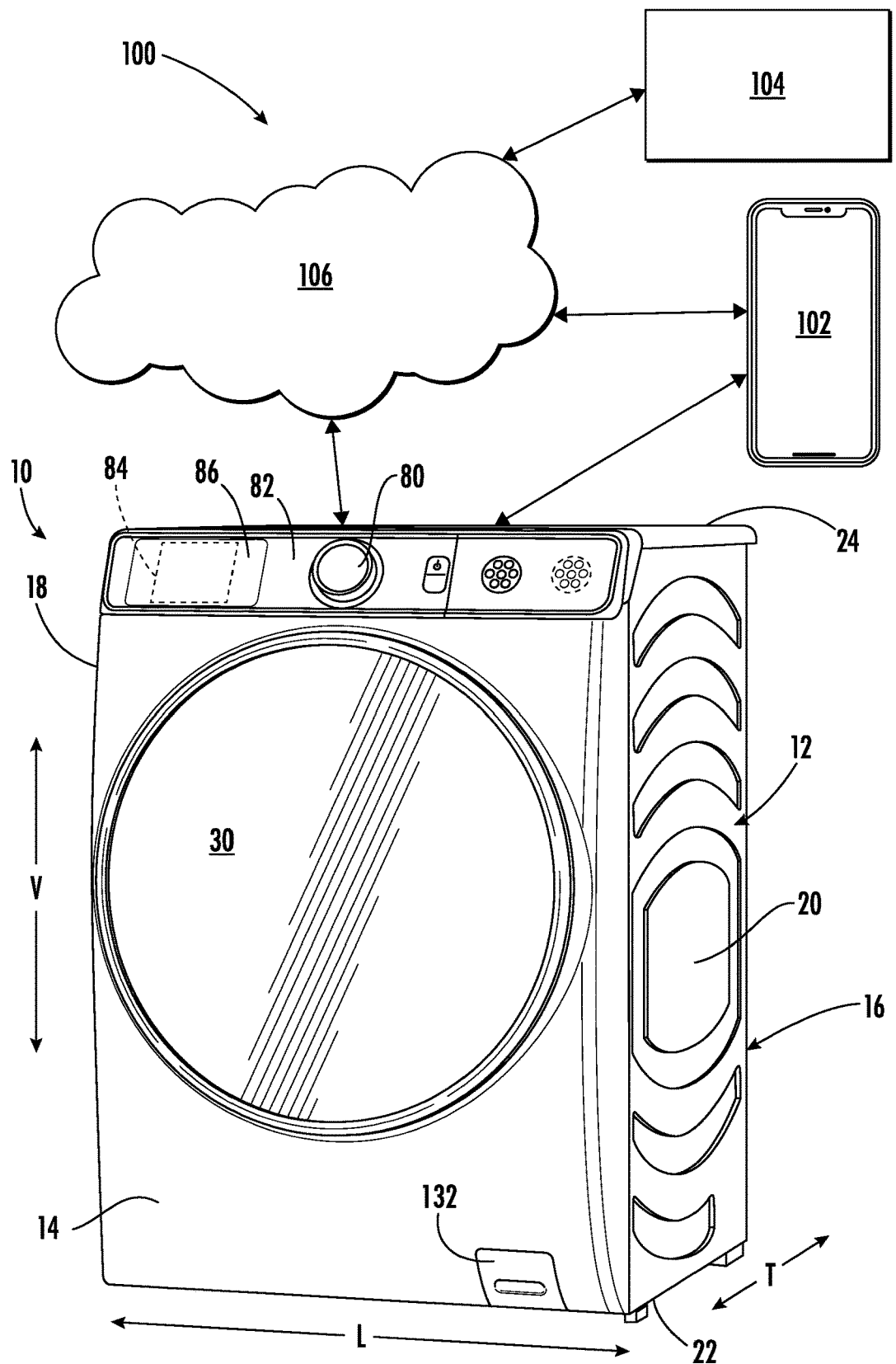
FIG. 1 provides a perspective view of a dryer appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
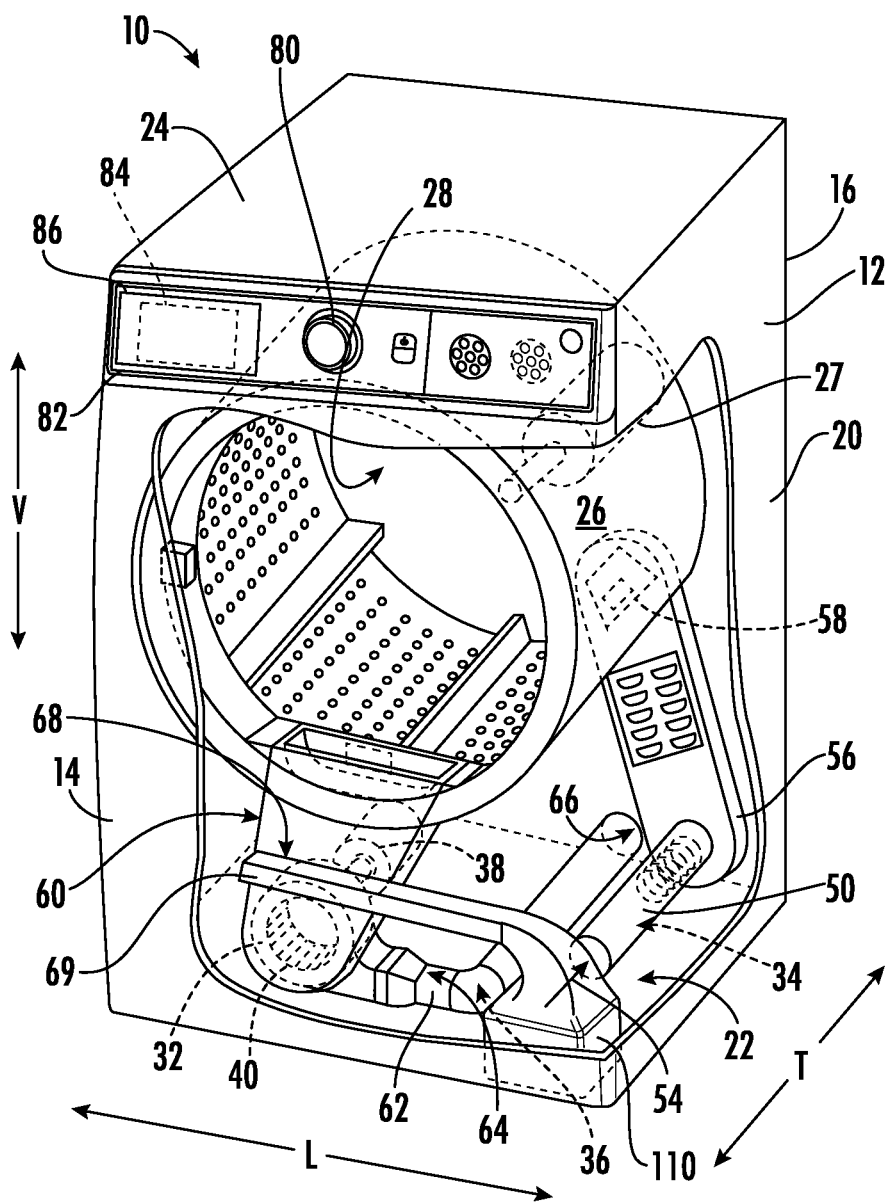
FIG. 2 provides a perspective view of the exemplary dryer appliance of FIG. 1 with portions of a cabinet of the exemplary dryer appliance removed to reveal certain components of the exemplary dryer appliance.

FIG. 1 illustrates a dryer appliance 10 according to an exemplary embodiment of the present subject matter. FIG. 2 provides another perspective view of dryer appliance 10 with a portion of a housing or cabinet 12 of dryer appliance 10 removed in order to show certain components of dryer appliance 10. While described in the context of a specific embodiment of a dryer appliance, using the teachings disclosed herein it will be understood that dryer appliance 10 is provided by way of example only. Other dryer appliances, including front or top-loaded dryer appliances, or combination washer/dryer appliances having different appearances and different features may also be utilized with the present subject matter as well.

Dryer appliance 10 defines a vertical direction V, a lateral direction L, and a transverse direction T. The vertical direction V, lateral direction L, and transverse direction T are mutually perpendicular and form an orthogonal direction system. Cabinet 12 includes a front panel 14 and a rear panel 16 spaced apart along the transverse direction T, a first side panel 18 and a second side panel 20 spaced apart along the lateral direction L, and a bottom panel 22 and a top cover 24 spaced apart along the vertical direction V. Within cabinet 12 is a container or drum 26 which defines a chamber 28 for receipt of articles, e.g., clothing, linen, etc., for drying. Drum 26 extends between a front portion and a back portion, e.g., along the transverse direction T. In example embodiments, drum 26 is rotatable, e.g., about an axis that is parallel to the transverse direction T, within cabinet 12. Rotation of drum 26 is driven by drum motor 27. A door 30 is rotatably mounted to cabinet 12 for providing selective access to drum 26.

As best shown in FIG. 2, an air handler 32, such as a blower or fan, may be provided to motivate an airflow (not shown) through an entrance air passage 34 and an air exhaust passage 36. Specifically, air handler 32 may include a motor 38 which may be in mechanical communication with a blower fan 40, such that motor 38 rotates blower fan 40. Air handler 32 is configured for drawing air through chamber 28 of drum 26, e.g., in order to dry articles located therein, as discussed in greater detail below. In alternative example embodiments, dryer appliance 10 may include an additional motor (not shown) for rotating fan 40 of air handler 32 independently of drum 26.

Drum 26 may be configured to receive heated air that has been heated by a heating assembly 50, e.g., in order to dry damp articles disposed within chamber 28 of drum 26. Heating assembly 50 includes a heater 52 that is in thermal communication with chamber 28. For instance, heater 52 may include one or more electrical resistance heating elements or gas burners, for heating air being flowed to chamber 28. As discussed above, during operation of dryer appliance 10, motor 38 rotates fan 40 of air handler 32 such that air handler 32 draws air through chamber 28 of drum 26. In particular, ambient air enters an air entrance passage defined by heating assembly 50 via an entrance 54 due to air handler 32 urging such ambient air into entrance 54. Such ambient air is heated within heating assembly 50 and exits heating assembly 50 as heated air. Air handler 32 draws such heated air through an air entrance passage 34, including inlet duct 56, to drum 26. The heated air enters drum 26 through an outlet 58 of inlet duct 56 positioned at a rear wall of drum 26.

Within chamber 28, the heated air can remove moisture, e.g., from damp articles disposed within chamber 28. This internal air flows in turn from chamber 28 through an outlet assembly positioned within cabinet 12. The outlet assembly generally defines an air exhaust passage 36 and includes a trap duct 60, air handler 32, and an exhaust conduit 62. Exhaust conduit 62 is in fluid communication with trap duct 60 via air handler 32. More specifically, exhaust conduit 62 extends between an exhaust inlet 64 and an exhaust outlet 66. According to the illustrated embodiment, exhaust inlet 64 is positioned downstream of and fluidly coupled to air handler 32, and exhaust outlet 66 is defined in rear panel 16 of cabinet 12. During a dry cycle, internal air flows from chamber 28 through trap duct 60 to air handler 32, e.g., as an outlet flow portion of airflow. As shown, air further flows through air handler 32 and to exhaust conduit 62.

The internal air is exhausted from dryer appliance 10 via exhaust conduit 62. In some embodiments, an external duct (not shown) is provided in fluid communication with exhaust conduit 62. For instance, the external duct may be attached (e.g., directly or indirectly attached) to cabinet 12 at rear panel 16. Any suitable connector (e.g., collar, clamp, etc.) may join the external duct to exhaust conduit 62. In residential environments, the external duct may be in fluid communication with an outdoor environment (e.g., outside of a home or building in which dryer appliance 10 is installed). During a dry cycle, internal air may thus flow from exhaust conduit 62 and through the external duct before being exhausted to the outdoor environment.

In exemplary embodiments, trap duct 60 may include a screen filter 68 for removing lint and other particulates as internal air is drawn out of chamber 28. The internal air is drawn through screen filter 68 by air handler 32 before being passed through exhaust conduit 62. After the clothing articles have been dried (or a drying cycle is otherwise completed), the clothing articles are removed from drum 26, e.g., by accessing chamber 28 by opening door 30.

One or more selector inputs 80, such as knobs, buttons, touchscreen interfaces, etc., may be provided on a front control panel 82 and may be in communication with a processing device or controller 84. Signals generated in controller 84 operate motor 38, heating assembly 50, and other system components in response to the position of selector inputs 80. Additionally, a display 86, such as an indicator light or a screen, may be provided on front control panel 82. Display 86 may be in communication with controller 84 and may display information in response to signals from controller 84.

As used herein, "processing device" or "controller" may refer to one or more microprocessors or semiconductor devices and is not restricted necessarily to a single element. The processing device can be programmed to operate dryer appliance 10. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations. For certain embodiments, the instructions include a software package configured to operate appliance 10 and execute certain cycles or operating modes.

In addition, referring again to FIG. 1, dryer appliance 10 may generally include an external communication system 100 which is configured for enabling the user to interact with dryer appliance 10 using a remote device 102. Specifically, according to an exemplary embodiment, external communication system 100 is configured for enabling communication between a user, an appliance, and a remote server 104. According to exemplary embodiments, dryer appliance 10 may communicate with a remote device 102 either directly (e.g., through a local area network (LAN), Wi-Fi, Bluetooth, etc.) or indirectly (e.g., via a network 106), as well as with a remote server, e.g., to receive notifications, provide confirmations, input operational data, transmit sound signals and sound signatures, etc.

In general, remote device 102 may be any suitable device for providing and/or receiving communications or commands from a user. In this regard, remote device 102 may include, for example, a personal phone, a tablet, a laptop computer, or another mobile device. In addition, or alternatively, communication between the appliance and the user may be achieved directly through an appliance control panel (e.g., control panel 82). In general, network 106 can be any type of communication network. For example, network 106 can include one or more of a wireless network, a wired network, a personal area network, a local area network, a wide area network, the internet, a cellular network, etc. In general, communication with network may use any of a variety of communication protocols (e.g., TCP/IP, HTTP, SMTP, FTP), encodings or formats (e.g., HTML, XML), and/or protection schemes (e.g., VPN, secure HTTP, SSL).

External communication system 100 is described herein according to an exemplary embodiment of the present subject matter. However, it should be appreciated that the exemplary functions and configurations of external communication system 100 provided herein are used only as examples to facilitate description of aspects of the present subject matter. System configurations may vary, other communication devices may be used to communicate directly or indirectly with one or more appliances, other communication protocols and steps may be implemented, etc. These variations and modifications are contemplated as within the scope of the present subject matter.

In some embodiments, dryer appliance 10 also includes one or more sensors that may be used to facilitate improved operation of dryer appliance. For example, dryer appliance 10 may include one or more temperature sensors which are generally operable to measure internal temperatures in dryer appliance 10 and/or one or more airflow sensors which are generally operable to detect the velocity of air (e.g., as an air flow rate in meters per second, or as a volumetric velocity in cubic meters per second) as it flows through the appliance 10. In some embodiments, controller 84 is configured to vary operation profiles of heating assembly 50 based on one or more temperatures detected by the temperature sensors or air flow measurements from the airflow sensors.

Figure 3:
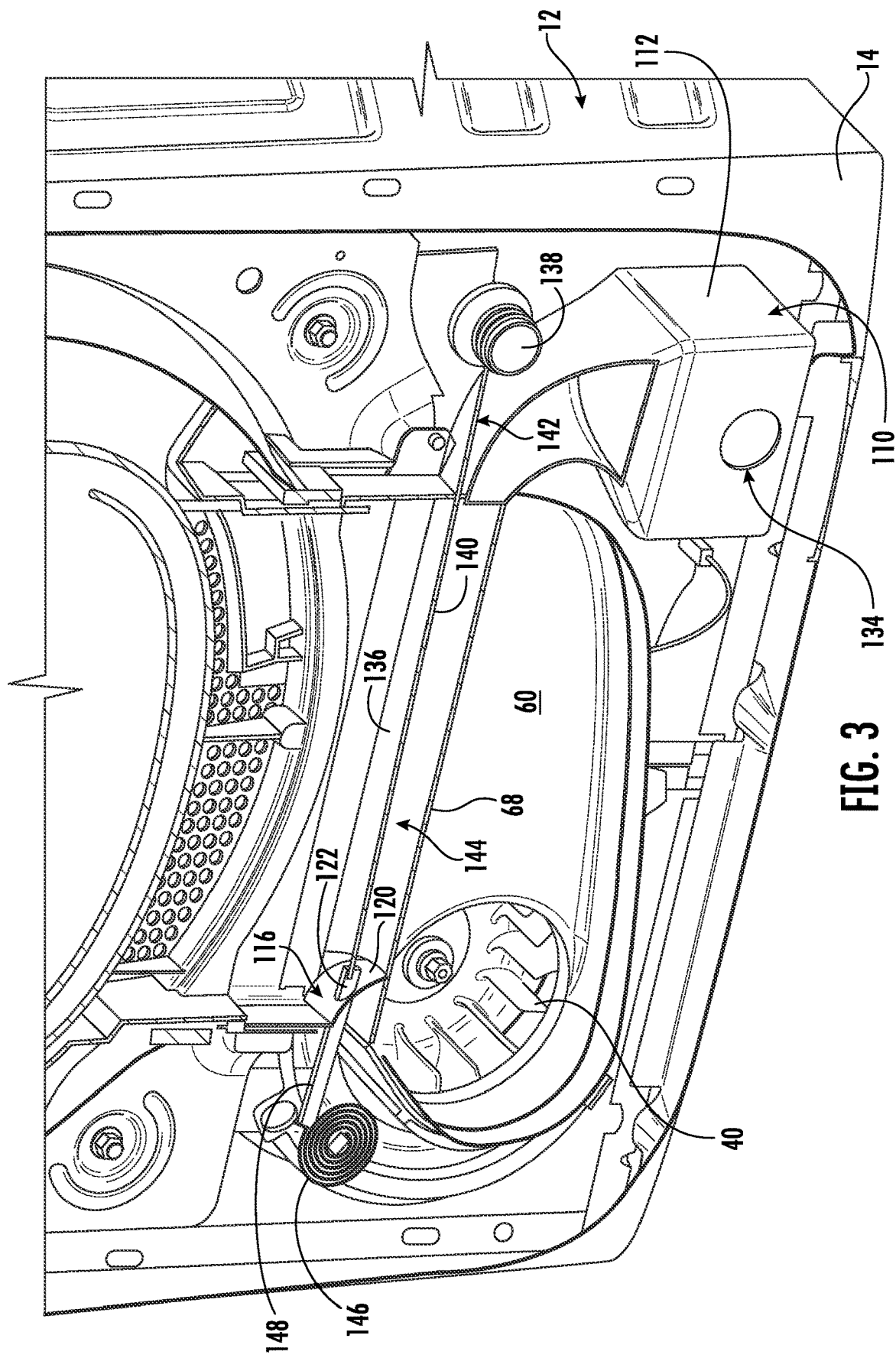
FIG. 3 illustrates a screen filter in a trap duct, a lint scratcher, lint collection bin, and components for moving scratcher according to exemplary embodiments of the present disclosure.

Referring now to FIG. 3, a system for automatically cleaning a lint filter according to an embodiment of the present disclosure is provided. As addressed above, screen filter 68 may be situated entirely or primarily within lint trap duct 60. Screen filter 68 may be formed of a plurality of wires arranged in a crossing pattern to define a plurality of perforations. The perforations are large enough to not significantly inhibit air flow through screen filter 68, but small enough to trap most lint and debris carried by the air flow. Trap duct 60 includes a cross-section in the lateral and transverse plan. Screen filter 68 is generally sized in the lateral and transverse direction to match the cross-section of the trap duct 60. Screen filter 68 further include a dimension in the vertical direction such that a filter surface 136 defines a trough that opens in the direction of the air flow. This trough provides a volume within which lint and other debris may collect during a drying cycle. Screen filter 68 includes two ends spaced apart in the lateral direction, wherein one of the ends is a collection end 69.

Figure 4:
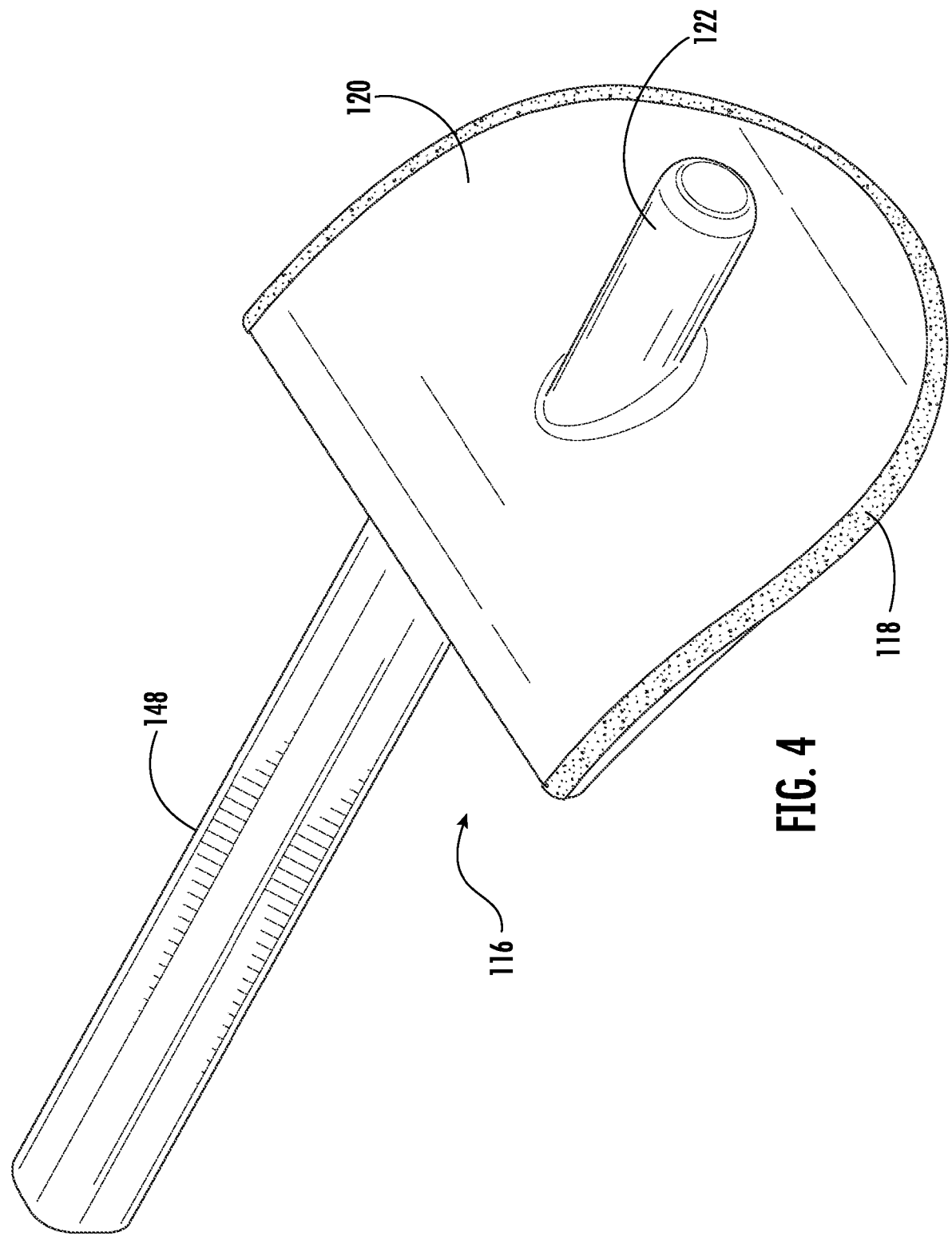
FIG. 4 provides a perspective view of a lint scratcher according to exemplary embodiments of the present disclosure.

As shown in FIGS. 3 and 4, dryer appliance 10 further includes a lint scratcher 116. Lint scratcher 116 includes a scratcher body 120 at the bottom of which is a scratching surface 118. Scratcher surface 118 is positioned such that it is in contact with screen filter 68, and specifically in contact with filter surface 136. A cross-section of filter surface 136 along the vertical and transverse plane will have a particular shape. The shape of the cross-section of filter surface 136 is not critical to the present disclosure except to the extent that it provides a trough for the collection of lint and debris, as previously described. Thus, the shape of the cross-section of filter surface 136 may be a semi-circle, a parabola, an arc, a half-rectangle or square, a v-shape, or any other shape creating depth for the collection of lint and debris. The cross-section shape of filter surface 136 may even be an irregular shape.

However, in certain embodiments, it is preferred that the cross-section shape of filter surface 136 be complementary to the shape of scratching surface 118 such that scratching surface 118 maintains contact with filter surface 136 along all points where lint and debris may accumulate. It should be recognized that these complementary shapes are not strictly necessary to practice the present disclosure as individual elements of lint tend to group together into a single unit as lint accumulates and pulling the lint at one position will typically pull adjacent portions of the accumulated lint. Thus, depending on a variety of factors, including the characteristics of the scratching surface 118 and the amount of surface area covered, a scratching surface 118 covering less than all of the filter surface 136 may still be effective in clearing lint and debris.

As noted, the characteristics of scratching surface 118 may affect the efficiency of cleaning. One such characteristic is the friction generated between scratching surface 118 and filter surface 136. The type of material that forms scratching surface 118 may therefore affect cleaning efficiency. While not necessary to practice the present disclosure, it may be desirable to coat scratching surface 118 with a higher friction material, such as rubber or other elastomers. In the embodiment of FIG. 4, in particular, scratching surface 118 is coated with an ethylene propylene diene monomer ("EPDM") rubber. However, in other embodiments, scratching surface 118 may be formed of other materials, or even the same materials that forms scratcher body 120, as a wide variety of other factors can be manipulated to ensure sufficient cleaning, such as, for example, the overlapping surface area and shapes of scratching surface 118 and filter surface 136, the material from which screen filter 68 is made, or the force at the area of contact between lint scratcher 116 and screen filter 68.

As shown in the embodiment of FIG. 4, lint scratcher 116 may further include a protrusion 122 extending from scratcher body 120 in the direction of collection end 69 of screen filter 68. Protrusion 122 extends from scratcher body 122 to such an extent that no other portion of lint scratcher 116 extends laterally beyond protrusion 122 in the direction of connection end 69 of screen filter 68. Protrusion 122 may be an integral portion of lint scratcher 116 in some embodiments. In alternative embodiments, protrusion 122 may be a separate element from lint scratcher 116 and attached to lint scratcher 116 by conventional means.

In some embodiments, such as shown in FIG. 4, lint scratcher 116 may further include a shaft 148 extending laterally from scratcher body 120 in the direction away from collection end 69 of screen filter 68. In embodiments where shaft 148 is employed, it aids in movement of lint scratcher 116, as further described herein. Shaft 148 may be an integral portion of lint scratcher 116 in some embodiments. In alternative embodiments, shaft 148 may be a separate element from lint scratcher 116 and attached to lint scratcher 116 by conventional means.

Figure 5:
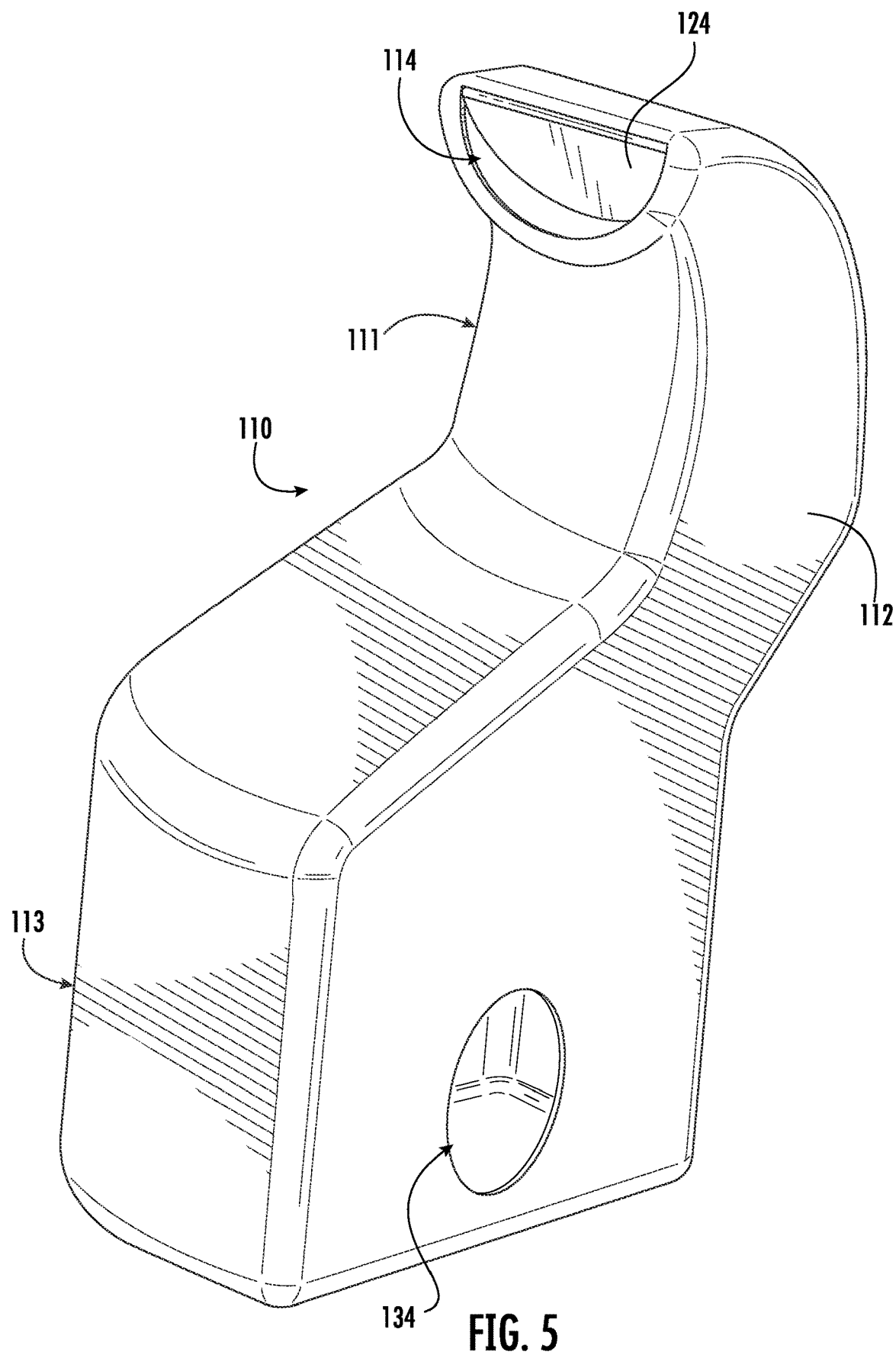
FIG. 5 provides a perspective view of a lint collector according to exemplary embodiments of the present disclosure.
Figure 6:
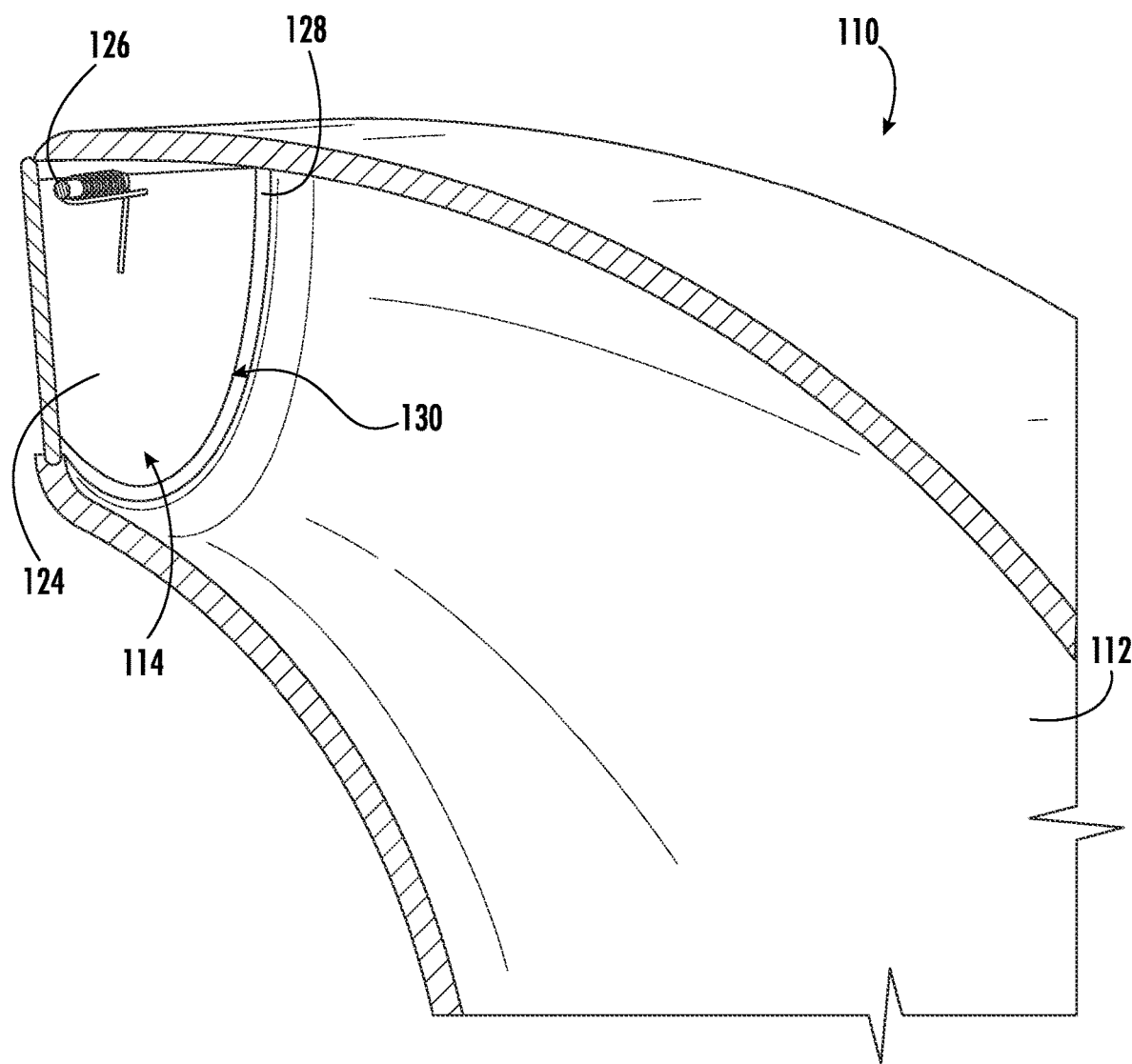
FIG. 6 provides a perspective view of internal view of a portion of a lint collector according to exemplary embodiments of the present disclosure.

Dryer appliance 10 may further include a lint collector 110. Lint collector 110 may be situated within cabinet 12, but entirely or primarily outside of lint trap duct 60. Lint collector 110 may include a collector body 112, a first opening, 114, a second opening 134, and a collector door 124, as shown in the embodiments of FIGS. 5 and 6. Collector body 112 of lint collector 110 is a container for storing lint and debris collected over time. Although no particular shape is required, it is preferred that the internal volume is as large as the dryer appliance 10 design permits so as to minimize the frequency with which its contents must be emptied. Further, the shape of lint collector 110 should avoid any internal shelves that prevent or otherwise inhibit gravity from pulling the lint or debris to the bottom of lint collector 110.

First opening 114 of lint collector 110 is located on an upper portion 111 of lint collector 110, such that most of the volume of collector body 112 is below first opening 114 to prevent previously collected lint and debris from fully or partially blocking first opening 114 or the operation of collector door 124, as further discussed herein. First opening 114 may be aligned with and abutting collection end 69 of screen filter 68. In some embodiments, collection end 69 of screen filter 68 may be attached directly or indirectly to collector body 112, around first opening 114, by conventional means such that no large gaps are formed between the two, where lint and debris could collect.

The skilled artisan will recognize that screen filter 68 is entirely or primarily within lint trap duct 60 and that lint collector 110 is entirely or primarily outside of lint trap duct 60. In embodiments screen filter 68 may extend through a side of lint trap duct 60. In alternative embodiments, a portion of lint collector 60 may extend through a side of lint trap duct 60. In still other embodiments, screen filter 68 and lint collector 60 may meet at opposite surface of a side of lint vent duct 660. In any of these embodiments, it is preferred that a sealant be applied where screen filter 68 and/or lint collector 110 meet the side of lint vent duct 60. The sealant could take the form of a gasket, an adhesive, welding, or any other known technique for preventing the passage of air from the lint vent duct into other portions of cabinet 12.

As shown in the embodiments of FIGS. 5 and 6, lint collector 110 further includes a collector door 124. Collector door may pivot between a closed position, wherein collector door 124 cover first opening 114 (FIG. 6), and an open position, wherein at least a portion of collector door 124 is within collector body 112 (FIG. 5). That is, collector door 124 pivots inwardly into collector body 112 as it opens. In the embodiments of FIGS. 5 and 6, collector door 124 is shown pivoting about a horizontal axis above collector door 124. In alternative embodiments, collector door 124 may also pivot about vertical axes on either side of collector door 124.

FIG. 6 provides an internal view of lint collector 110, showing a rear side of collector door 124. As shown, lint collector 110 may further include a spring 126. Spring 126 may be attached to collector door 124, as shown, or may be attached to collector body 112 in proximity to collector door 124, wherein a portion of spring 126 may be in contact with collector door 124. Spring 124 may be torsion spring positioned to bias collector door 124 in the closed position.

As also shown in FIG. 6, lint collector 110 may further a include a door gasket 128. Door gasket 128 may extend around a perimeter 130 of first opening 114. Door gasket 128 may further be situated between collector door 124 and collector body 112 when collector door 124 is in the closed position. In this way, air passing through lint vent duct 60 is prevented from entering lint collector 110 when collector door 124 is in the closed position.

Lint collector 110 may further include a second opening 134. Second opening 134 may be located on a lower portion 113 of collector body 112, where lint and debris collect. A covering (not pictured), such as a plug or a cap, may be provided to prevent the escape of lint and debris when undesirable. Front panel 16 of cabinet 12 may further include an access port 132. Access port 132 may be aligned with second opening 134 of lint collector 110. Access port 132 may include a moveable door, enabling users to access second opening 134 of lint collector 110 for clearing out of lint and debris from lint collector 110 periodically.

Figure 7:
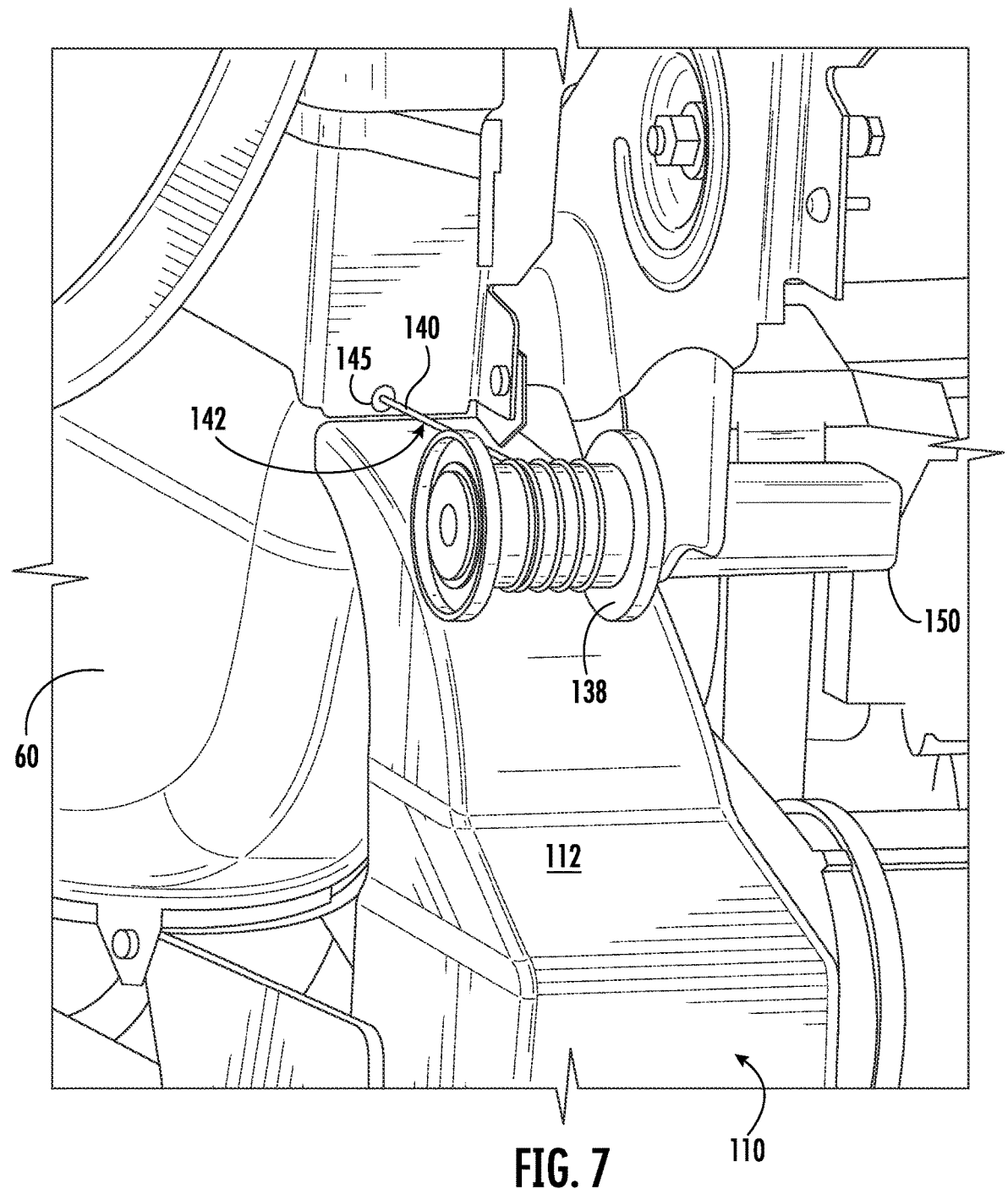
FIG. 7 provides a perspective view a spool and tethered line according to exemplary embodiments of the present disclosure.

Dryer appliance 10 may further include a rotatable spool 138 and a motor 150, as shown in the embodiment of FIG. 7. Motor 150 may be in mechanical communication with spool 138. When motor 150 is powered, a rotational force is applied to spool 138, causing spool 138 to rotate in a first direction. The first direction may be clockwise or counterclockwise. Motor 150 and spool 138 are contained within cabinet 12, but outside of lint vent duct 60. Motor 150 and spool 138 may be on the same side of lint vent duct as lint collector 110.

Dryer appliance 10 may further include a line 140. Line 140 may be a cable, thread, wire, string, rope, or any other similar device for withstanding tensile forces. Line 140 includes a first end 142 and second end 144, as shown in the embodiment of FIG. 3. First end 142 of line 140 may be attached to spool 138, as shown in the embodiment of FIG. 7. In this arrangement, powering motor 150 rotates spool 138, winding line 140 about spool 138. Line 140 may extend from spool 138 and into vent duct 60. Where line 140 passes through a side of vent duct 60, a line gasket 145 may be employed to prevent air leaking from lint vent duct 60 into other portions of cabinet 12.

Figure 8:
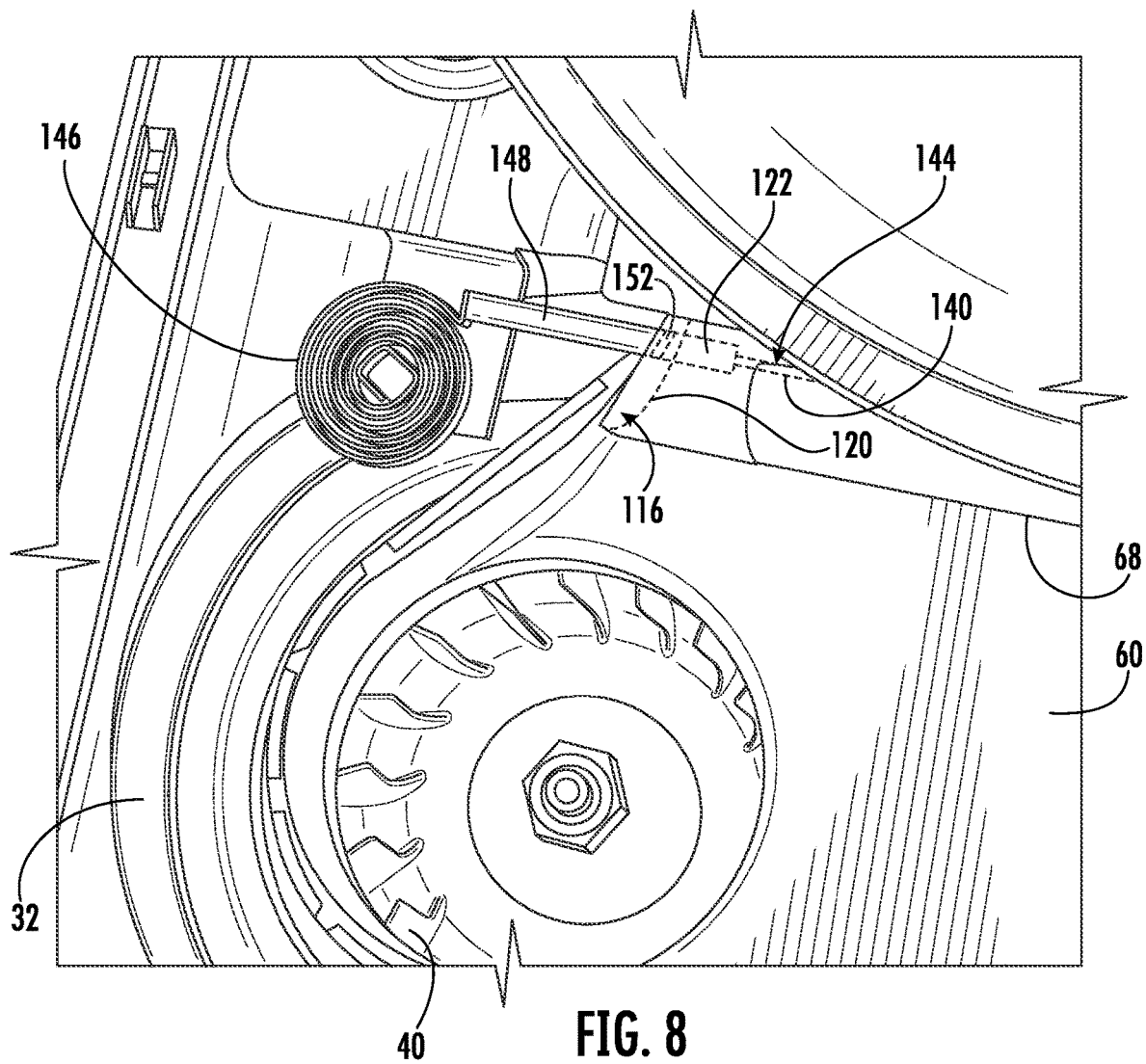
FIG. 8 provides a front view of a constant force spring and lint scratcher according to exemplary embodiments of the present disclosure.

In addition, dryer appliance 10 may also include a constant force spring 146, as shown in the embodiment of FIG. 8. Constant force spring 146 is contained within cabinet 12 on an opposite side of lint vent duct 60 from spool 138 and lint collector 110. Although constant force spring 146 is depicted as fixed coil spring in the embodiment of FIG. 8, one of ordinary skill will recognize that this is not required. The scope of the present disclosure would also include, for example, moving coil constant force springs as well. Constant force spring 146 may be secured to cabinet 12 directly or indirectly (e.g., via a flange) in this embodiment. In the embodiment of FIG. 8, constant force spring 146 is attached to lint scratcher 116. In particular, constant force spring 146 is attached to shaft 148 of lint scratcher 116. In such embodiments, second end 144 of line 140 may be attached to lint scratcher 116. Constant force spring 146 exerts a force sufficient to rotate spool 138 in a second direction, opposite the first direction, when motor 150 is not powered. Constant force spring 146, lint scratcher 116, and spool 138 together exert a tension force on line 140 such that line 140 remains taut.

Also, in embodiments such as shown in FIG. 8, shaft 148 of lint scratcher 116 extends through a side of lint vent duct 60. In order to prevent air passing through lint vent duct 60 from escaping into other portions of cabinet 12, it is therefore preferable to include a further gasket 152 where shaft 148 passes through lint vent duct 60. In alternative embodiments, lint scratcher 116 may not include a shaft 148. In such embodiments, second end 144 of line 140 may attach directly to constant force spring 146. Lint scratcher may further attach to line 140 at a fixed point between first end 142 and second end 144 of line 140. In such embodiments, line 140 would pass through lint vent duct 60 and gasket 152 would be used at that location to prevent leakage of air.

With the components described above, lint scratcher 116 is moveable relative to screen filter 68 in the lateral direction for cleaning lint and debris from screen filter 68. A user may select a drying cycle using selector inputs 82 at control panel 84. For a given drying cycle, controller 84 may be configured to clean screen filter 68 at the end of the drying cycle. In alternative embodiments, controller 84 may be configured to clean screen filter 68 at the end of the drying cycle and a one or more points during the drying cycle. In still other embodiments, controller 84 may be configured to clean screen filter 68 at the outset of the drying cycle. Combinations of these techniques are also possible, as one of skill in the art will recognize.

Once controller 84 determines that screen filter 68 should be cleaned, it preferably first deactivates fan 40, causing air flow through chamber 28 and lint vent duct 60 to cease. Although deactivation of the fan is not strictly necessary to practice the present disclosure, doing so prevents air from entering lint collector 110 and from escaping through the opening left by shaft 148 of lint scratcher 116 when lint scratcher moves toward lint collector 110, as further described herein.

Controller 84 next powers motor 150, which rotates spool 138. As spool 138 rotates, line 140 tethers around spool 138, exerting a force on lint scratcher 116 and, through lint scratcher 116, on constant force spring 146 that overcomes the force of constant force spring 146. Accordingly, lint scratcher 116 moves in the direction of collection end 69 of screen filter 68. As lint scratcher 116 moves, scratching surface 118 pushes lint and debris that has accumulated on screen filter 68 in the direction of collection end 69 of screen filter 68. As lint scratcher 116 approaches lint collector 110, protrusion 122 of lint scratcher 116 contacts collector door 124, push it into the open position. Lint scratcher 116 continues to move toward lint collector 110, ultimately pushing lint and debris into the first opening 114 of lint collector 110.

Controller 84 then cuts power to motor 150. Constant force spring 146 exerts sufficient force on line 140, through lint scratcher 116, to rotate spool 138, unwinding line 140 and pulling lint scratcher laterally away from collection end 69 of screen filter 68 until lint scratcher has returned to its original position.

While described in the context of a specific embodiment of dryer appliance 10, using the teachings disclosed herein it will be understood that dryer appliance 10 is provided by way of example only. Other dryer appliances or laundry appliances having different configurations, different appearances, and/or different features may also be utilized with the present subject matter as well. For example, the present subject matter may be employed in vented dryer appliances utilizing gas or electric heaters or heat pump-based dryer appliances that circulate air in a closed loop. Other exemplary laundry appliances may include, for example, front- or top-loading washer appliances or combination washer/dryer appliances. Moreover, the systems and methods described herein may be used to monitor drum rotation in any other suitable appliance or appliances.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dryer appliance comprising:
    a cabinet having a front side;
    a drum rotatably mounted within the cabinet, the drum defining a chamber for receipt of articles of laundry;
    a lint vent duct in fluid communication with the chamber;
    a screen filter within the lint vent duct, the screen filter including a collection end and shaped to form a trough;
    a lint scratcher moveable relative to the screen filter, the lint scratcher including
        a scratching surface, wherein the scratching surface is in contact with the screen filter;
        a scratcher body;
        a shaft extending laterally from the scratcher body in a direction away from the collection end of the screen filter, wherein at least a portion of the shaft extends through the lint vent duct when the lint scratcher is at the opposite end of the screen filter from the collection end;
        a protrusion extending laterally from the scratcher body in the direction of the collection end of the screen filter;
    a lint collector including
        a collector body;
        a first opening, wherein the first opening is aligned with the collection end of the screen filter;
    a rotatable spool external to the lint vent duct and located on the same side of the lint vent duct as the lint collector;
    a line having a first end and a second end, the line attached to the rotatable spool at the first end and the lint scratcher at the second end;
    a constant force spring external to the lint vent duct is located on an opposite side of the lint vent duct from the spool and lint collector, the constant force spring attached to the lint scratcher; and
    a motor for rotating the spool.

2. The dryer appliance of claim 1, wherein the lint collector further includes a collector door pivotably connected to the collector body for pivoting between a closed position, wherein the collector door is vertical and covers the first opening, and an open position, wherein at least a portion of the collector door is within the collector body.

3. The dryer appliance of claim 1, wherein the screen filter includes a filter surface having a cross-section in the vertical and transverse plane with a shape that is complementary to the shape of the scratching surface of the lint scratcher.

4. The dryer appliance of claim 1, wherein the constant force spring exerts a force sufficient to rotate the spool when the motor is not operating.

5. The dryer appliance of claim 1, wherein the constant force spring is attached directly to the shaft of the lint scratcher.

6. The dryer appliance of claim 1, wherein the lint vent duct further includes a shaft gasket where the shaft extends through the lint vent duct.

* * * * *